May 4, 1954  W. VAN LOON  2,677,603
PROCESS AND APPARATUS FOR THE GASIFICATION
OF FINE-GRAINED CARBONACEOUS SUBSTANCES
Filed Dec. 27, 1948
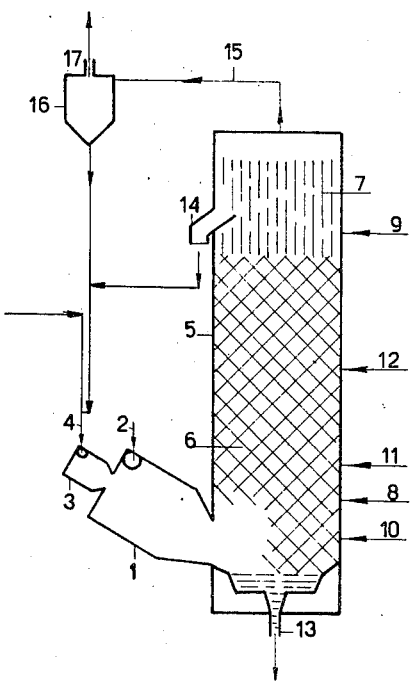
INVENTOR
Willem Van Loon
By Cushman, Darby & Cushman
Attorneys Patented May 4, 1954

UNITED STATES PATENT OFFICE 2,677,603

2,677,603

PROCESS AND APPARATUS FOR THE GASIFICATION OF FINE-GRAINED CARBONACEOUS SUBSTANCES

Willem van Loon, Sittard, Netherlands, assignor to De Directie van de Staatsmijnen in Limburg, Heerlen, Netherlands Application December 27, 1948, Serial No. 67,484

Claims priority, application Netherlands December 29, 1947

7 Claims. (Cl. 48—76)

The present invention relates to a process for the gasification of fine grained carbonaceous substances and also relates to apparatus for carrying out the said gasification. The special features of the process and apparatus according to the invention will be hereinafter set forth.

In the well known processes for gasifying fine grained carbonaceous substances, such as fine coal, small coke, sawdust, coal slime, etc., usually called dust gasification, the efficiency at a definite capacity of the reactor employed is considerably lower than in the gasification of coarse grained material under comparable circumstances in a reactor of the same capacity, where capacity means the number of cubic meters of CO and $H_2$ per cubic meter of reactor volume. This unfavorable result is obtained despite the fact that the rate of gasification is proportional to the surface area of the particles which are gasified, and is chiefly due to the fact that in dust gasification in accordance with prior methods, the reactions of gasification and the mechanism of gasification in a fixed gasification bed are not sufficiently accounted for, because the dust gasification is incorrectly founded on the principles of the gasification of coarse grained material in shaft producers. If the dust gasification is performed in accordance with the counterflow principle usually employed in shaft producers, the rate of gasification at high temperatures is so high that the average speed of the gas becomes considerably higher than the speed of fall of the small particles. On this account the counterflow principle can not be applied without difficulty to dust gasification, which circumstance has given rise to methods where the dust gasification is performed in a floating bed in accordance with the conflow principle (Wintershall-Schmalfeldt), and to methods founded on a combination of this principle with the crossflow principle (Koppers, Winkler). Working with the crossflow principle presents the advantage that a high dust concentration and a fine transmission of heat can be attained, but the thermal efficiency obtained is low, because the produced gases leave the reactor at almost the same high temperature which prevails in the gasification, whereas, besides, many solid particles are carried along by the gas mixture. In connection herewith it has been suggested to connect behind the gasifying reactor a second chamber, usually called the secondary producer, in which the gasification of the particles which were carried along takes place. In the so-called Winkler process this secondary gasification is performed after adding oxygen to the gas mixture, with the drawback, however, that the temperature of the gas mixture becomes still higher than the temperature of gasification. According to the so-called Koppers process an improvement is effected by establishing a number of boiling beds, one on top of the other, causing the reactor to resemble a plate column such as employed in distillation, so that the dust gasification is performed in more or less uniform reaction spaces fitted on top of each other, behind which reactor a secondary producer is placed for the purpose of gasifying the particles which were carried along.

The well known methods of dust gasification are characterized by the utilization of such a second producer, in which the gasification takes place at a much lower dust concentration than prevails in the first reactor, as a result whereof, however, the capacity of the gasification is low.

Now it was found that favorable results are obtained in the gasification of fine grained carbonaceous material in two reactors connected in series, if the volume of the reaction space in one reactor (the big reactor) is a multiple of the volume of the reaction space in the other reactor (the small reactor), and if the gasification in the small reactor takes place by applying the crossflow principle, at a high temperature and with a high capacity, but with a low efficiency, and the gasification in the big reactor takes place at an artificially increased concentration of the particles to be gasified, at a lower average temperature, with a lower capacity and with a higher efficiency than in the small reactor.

When comparing the process according to the invention with the gasification of coarse grained fuel in a shaft producer which works according to the counterflow principle, it can be pointed out that at the bottom of such a shaft producer a zone of high temperature and high capacity, which is short in proportion to the remaining part of the shaft, is maintained, on the one hand because of the supply of fuel which is preheated up to gasification temperature, and on the other hand because of the high temperature and the high oxygen content of the gasifying medium. This zone of high temperature and high concentration is short, because as a result of the endothermic character of the gasifying reaction, the temperature falls rapidly at first and more slowly thereafter, due to the decrease of the rate of reaction of the gasification as a result of the lower temperature and the decrease in concentration of the active components of the gasifying medium. In this way the short zone of high temperature and high capacity is followed by a much longer zone of lower temperature and lower capacity. The longer the latter zone, the higher the efficiency of the producer.

In the process according to the invention two zones may be mentioned by way of comparison, the small reactor corresponding to the aforementioned short zone of high temperature and high concentration, whereas the big reactor corresponds to the longer zone of lower temperature and lower capacity. Further, the process according to the invention effects a high efficiency corresponding to that of the above-mentioned shaft producer for coarse grained material.

In the small reactor in accordance with the invention it is necessary for the purpose of maintaining a high temperature that the time of stay of the reacting gases be small in proportion to the total time of contact, which is simply effected because the volume of this reactor is smaller than of the big reactor. In order to obtain a fine contact between the particles to be gasified and the gasifying medium, and a long time of stay of the particles to be gasified, the crossflow principle is utilized in the big reactor.

By maintaining a high temperature in the small reactor, the following advantages are obtained:

1. The ash parts of the particles can be drained off as molten slag, which presents a special advantage in dust gasification, among other things because in this way the percentage of fly ash of the produced gas mixture can be kept very low. The drain of the molten slag can, if required, also be effected from the big reactor;

2. Because of the relatively small size of the small reactor, the same can quite readily be constructed to withstand high temperatures;

3. Because of the high temperature the proportion between the quantity of $O_2$ and the quantity of $H_2O$ and/or $CO_2$ in the gasifying medium can be adjusted to such a value, preferably a proportion ranging from 1:09–1:15, that a gas mixture is produced having a very slight quantity of ballast of $CO_2$ and $H_2O$.

The requirements of a high temperature, a short time of stay, the cross-flow principle, molten slag and of a relatively small reactor can be fulfilled by utilizing a cyclone as the small reactor. By operating the process in accordance with the invention with a cyclone as the small reactor very fine results are obtained.

In the big reactor, which is utilized in the process of the invention, the components which act as gasifying agents and are still present in the gas mixture issuing from the small reactor, react with the unconverted parts of the material to be gasified at a lower temperature than that which prevails in the small reactor. On account of this the time of stay of the gas in this big reactor must be longer, in order to permit a sufficient contact between the gasifying medium and the particles to be gasified. This contact is furthermore promoted by artificially increasing the concentration of the particles, which can be done e. g. by applying one or more of the well known boiling bed systems as applied in the first reactor in some of the prior methods, e. g. of Koppers, or by applying a system as described in The Netherlands patent application No. 139,260, where the gasification of the bigger particles takes place in accordance with the counterflow principle and the smaller particles which are not gasified are carried along out of the reactor, and when separated from the gas mixture can be fed to the small reactor.

The separation of solid particles from the reaction mixture leaving the big reactor is of particular interest when carrying out the process according to the invention in such a manner that the initial material to be gasified is first introduced into the big reactor, and the particles not gasified therein are separated from the gases advantageously by means of a cyclone, and are fed to the small reactor.

Moreover the big reactor may be arranged, for the purpose of increasing the concentration of the particles, in the manner described in Netherlands patent application No. 137,741, by which a favorable effect can be obtained in a simpler way than in the above mentioned system according to Koppers. In such case a special advantage can be obtained at the same time if coke is utilized as filling material, because the surface of carbon in the reaction is then increased, beside other advantages, like avoiding losses by wear and tear, since the refractoriness of the filling material does not present any problem.

Besides, when constructing the big reactor in compliance with the system, described in the above mentioned Netherlands patent application No. 137,741, it is possible to utilize ores as filling material, and thereby to work this reactor as a blast furnace, in which case, moreover, no layers of coke or of other fuel need be established. In this way a blast furnace of high capacity can be attained at low fuel cost.

The latter system also presents the advantage that the crossflow principle is combined with the conflow principle, according to which in the big reactor several zones can be distinguished, where the conditions of reaction, such as the temperature, are different. This fact can be availed of by introducing water vapor and/or $CO_2$ and/or hydrocarbons into this reactor in one or more places. Catalysts can also be provided inside the reactor for the conversion of CO with water vapor, as well as catalysts for the formation of $CH_4$, whereby the composition of the produced gas mixture can be regulated.

This regulation of the composition of the produced gas mixture can also take place, if other systems are applied when fitting the big producer. Besides, the composition can be influenced by adding to the mixture coming from the small reactor the carbonaceous substances to be gasified and/or gasifying agents, such as flue gases and/or gases which contain oxygen. Water vapor and/or carbonic acid and/or hydrocarbons can also be added to the same. Besides, the composition of the gas mixture can be regulated by connecting two or more small reactors, preferably cyclones, in parallel and by connecting them with one big reactor.

When working with a molten slag drain, the produced gas mixture can be wholly freed by a cyclone of the fly ash which may still be present therein, which fly ash, when containing unconverted carbonaceous material, can be returned to the small reactor, if required.

The draining of the molten slag can be effected from the small reactor as well as from the big reactor, or from both reactors. When draining molten slag from the big reactor, the temperature at the bottom of this reactor should be higher than the temperature at which the slag becomes molten. In this way the advantage is obtained, that the slag drops which are carried along by the gas mixture serve to fix a portion of the particles to be gasified to the filling at the bottom part of the reactor. This effect can be enhanced by introducing oxygen or gases which contain free oxygen at the bottom of the reactor, or by adding the same to the mixture coming from the small reactor, whereby the so-fixed carbon is burned, maintaining the temperature above the melting point of the slag, so that the slag may remain molten and drip off.

The process according to the invention can be performed in an efficient manner by utilizing in the usual way the heat which is present in the produced gas mixture, preferably for the purpose of preheating the material to be gasified. This exchange of heat can also take place by means of a boiling bed and/or a column of filling bodies.

When using a cyclone as the small reactor the preheating of the material which is advantageously fed into the said cyclone by means of a feed cyclone can be effected in such manner that the material is heated in the feed cyclone to about the reaction temperature, by feeding into the feed cyclone a fuel, preferably gaseous, and burning the fuel therein with oxygen or a gas containing oxygen.

The process according to the invention may be performed for example in the manner indicated and illustrated by the diagram of the annexed drawing. According to this drawing the gasifying agents are introduced at 2 into the small reactor 1, which has the form of a cyclone, whereas by means of a small feed cyclone 3 with an inlet opening 4 the material to be gasified is introduced into the reactor together with an auxiliary gas. In the big reactor 5 a column with filling bodies 6 is provided, and on the top thereof a boiling bed 7 is maintained. In this reactor the material to be gasified is supplied at 8 and/or 9, whereas gases which contain oxygen are introduced at 10 and water vapor at 11 and 12. The molten slag is drained off at 13, whereas the heavier particles leave the reactor at 14, and at 15 leave the gas mixture and the lighter particles. The lighter particles are separated in the cyclone 16 from the gas which leaves at 17, and are returned into the feed cyclone at 4 together with the heavier particles.

I claim:

1. A closed circuit process for completely gasifying fine grained carbonaceous material comprising the steps of passing said material through a first reaction zone by means of a turbulent current of free-oxygen containing gas, the oxygen content of which is insufficient for complete combustion of the carbonaceous material, partially burning said material in said first reaction zone at a temperature above the melting point of the ash constituents, passing the gaseous combustion products entraining unburned material upwardly through a second reaction zone larger than said first reaction zone, introducing additional oxidizing gas selected from the group consisting of free-oxygen containing gas, steam, carbon dioxide and mixtures thereof into the second reaction zone at a rate that yields, at the temperatures and reaction conditions in said zone, a product gas comprising carbon monoxide and hydrogen as its major constituents, increasing the solids concentration in said second reaction zone to a fluidized bed and further gasifying said material therein at a temperature lower than that prevailing in said first reaction zone, removing molten slag from the stream of solids and gases before the temperature of said stream is reduced below the melting point of the slag, separating ungasified solids from the gas at the upper end of said second reaction zone, and returning the separated solids to said first reaction zone.

2. A process as defined in claim 1, wherein said carbonaceous material is introduced initially into the lower part of said second reaction zone.

3. A closed circuit process for completely gasifying fine grained carbonaceous material comprising the steps of passing said material through a cylonic current of free-oxygen containing gas, the oxygen content of which is insufficient for complete combustion of the carbonaceous material, partially burning said material in said cyclonic current at a temperature above the melting point of the ash constituents, passing the gaseous combustion products entraining unburned material upwardly through a second reaction zone larger than said cyclonic current, introducing additional oxidizing gas selected from the group consisting of free-oxygen containing gas, steam, carbon dioxide and mixtures thereof into the second reaction zone at a rate that yields, at the temperatures and reaction conditions in said zone, a product gas comprising carbon monoxide and hydrogen as its major constituents, increasing the solids concentration in said second reaction zone to a fluidized bed and further gasifying said material therein at a temperature lower than that prevailing in said cyclonic current, removing molten slag from the stream of solids and gases before the temperature of said stream is reduced below the melting point of the slag, separating ungasified solids from the gas at the upper end of said second reaction zone, and returning the separated solids to said cyclonic current.

4. A process as defined in claim 3, wherein said corbonaceous material is introduced initially into the lower part of said second reaction zone.

5. A process as defined in claim 3, wherein the solids are concentrated in said second reaction zone by a column of filling bodies therein.

6. A process as defined in claim 3, wherein the solids are concentrated in said second reaction zone by a column of coke therein.

7. A closed circuit apparatus for the manufacture of gas mixtures by gasifying fine grained carbonaceous material comprising a cyclone, means for introducing fine grained carboneous solids into said cyclone, means for introducing free-oxygen containing gas into said cyclone to partially burn said material at high temperature, a reaction chamber exceeding in volume said cyclone, means for conducting the stream of solids and gases issuing from said cyclone to the lower part of said reaction chamber, means for introducing additional oxidizing gas into said reaction chamber to yield a product gas comprising carbon monoxide and hydrogen as its major constituents, means in said reaction chamber for increasing the solids concentration therein to a fluidized bed, means for removing molten slag from said stream of solids and gases prior to its concentration to said fluidized bed, means for separating ungasified solids from the gas emerging from the upper part of said reaction chamber, and means independent of said reaction chamber for returning the solids so separated to said cyclone.

References Cited in the file of this patent

UNITED STATES PATENTS

| Number | Name | Date |
| --- | --- | --- |
| 1,913,968 | Winkler | June 13, 1933 |
| 2,357,301 | Bailer et al. | Sept. 5, 1944 |
| 2,436,938 | Scharmann et al. | Mar. 2, 1948 |
| 2,494,337 | Hemminger | Jan. 10, 1950 |
| 2,534,728 | Nelson et al. | Dec. 19, 1950 |
| 2,538,219 | Welty, Jr. | Jan. 16, 1951 |
| 2,554,263 | Nelson | May 22, 1951 |

FOREIGN PATENTS

| Number | Country | Date |
| --- | --- | --- |
| 487,886 | Germany | Dec. 17, 1929 |